July 14, 1970  J. PERRELLI  3,520,341
DRUPE PITTER AND METHOD
Filed Oct. 9, 1967  3 Sheets-Sheet 1
FIG_1
FIG_3
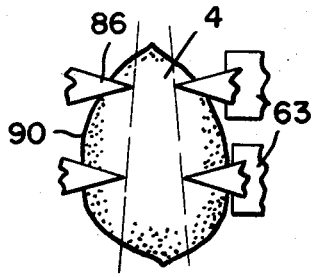
FIG_2
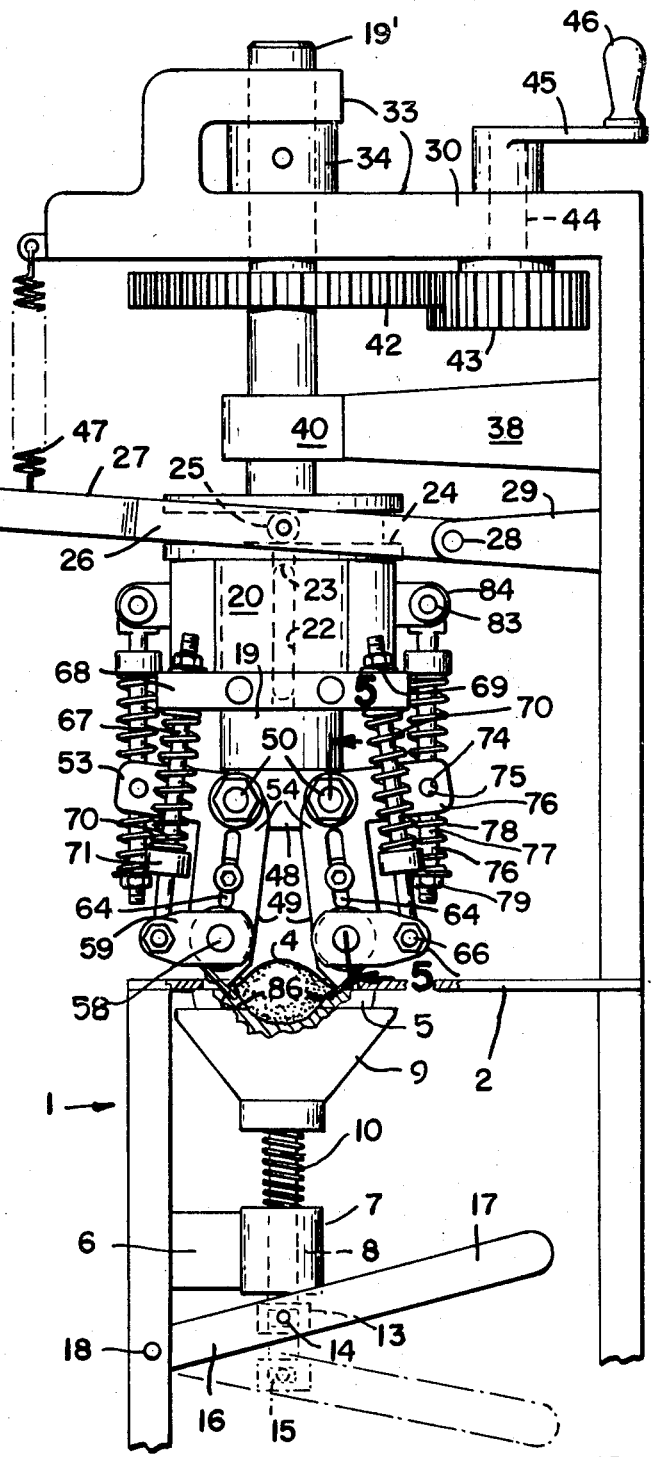
FIG_4
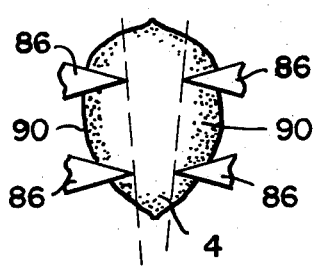
INVENTOR.
JOSEPH PERRELLI
BY
Boyken, Mohler, Foster & Schwab
ATTORNEYS July 14, 1970   J. PERRELLI   3,520,341
DRUPE PITTER AND METHOD
Filed Oct. 9, 1967   3 Sheets-Sheet 2
FIG_5
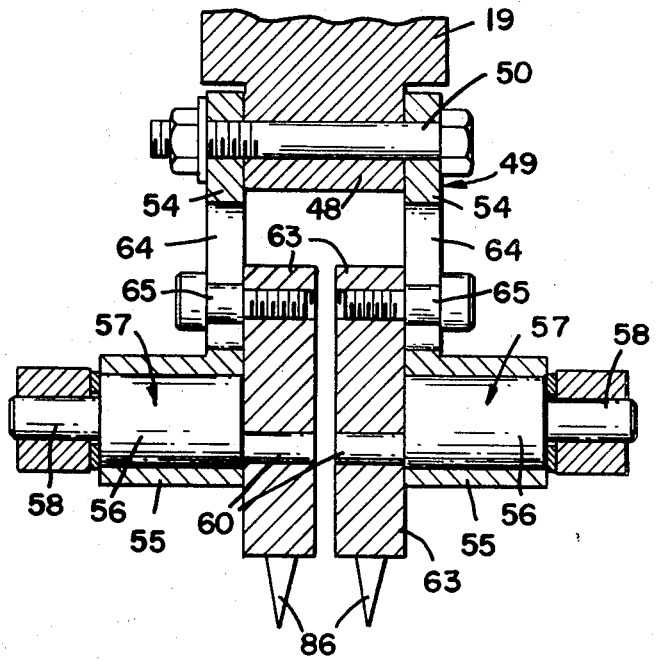
FIG_6
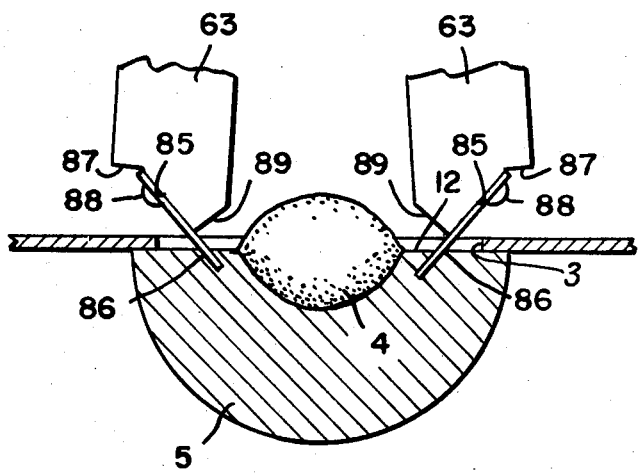
INVENTOR.
JOSEPH PERRELLI
BY
Boyken, Mohler, Foster & Schlemmer
ATTORNEYS July 14, 1970  J. PERRELLI  3,520,341
DRUPE PITTER AND METHOD
Filed Oct. 9, 1967  3 Sheets-Sheet 3
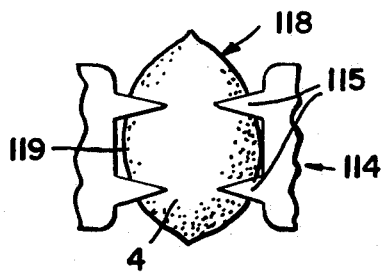
FIG_9
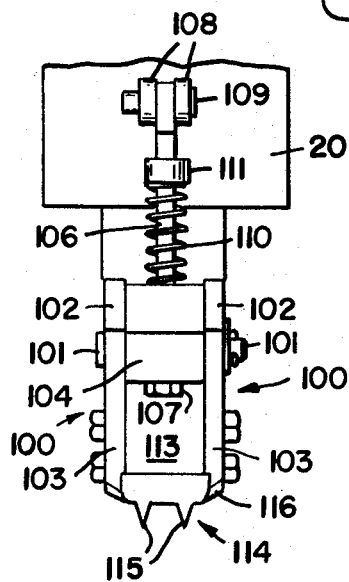
FIG_8
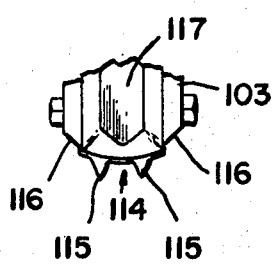
FIG_10
FIG_7
INVENTOR.
JOSEPH PERRELLI
BY
ATTORNEYS

United States Patent Office 3,520,341
Patented July 14, 1970

3,520,341
DRUPE PITTER AND METHOD
Joseph Perrelli, El Cerrito, Calif., assignor to Filper Corporation, San Ramon, Calif., a corporation of California
Filed Oct. 9, 1967, Ser. No. 673,778
Int. Cl. A47j 23/00
U.S. Cl. 146—238                                          4 Claims

ABSTRACT OF THE DISCLOSURE

A pitter for drupe halves having a holder to engage the convex hemispherical surface of a drupe half and to support it with its exposed pit or pit half exposed for gripping the pit at opposite edges between jaws having generally opposed pairs of spaced tines adapted to enter the fruit halves at opposite edges of the pit or pit halves to grip the pit at a plurality of spaced points to preclude slippage of the jaws relative to the pit when the pit is twisted relative to the body of the half to free it from the half.

BACKGROUND OF INVENTION

In my U.S. Pats. 2,880,774 and 2,975,812, respectively dated Apr. 7, 1959 and Mar. 21, 1961, are shown pitters similar to the one hereinafter described. In each of these, pit gripping jaws engage opposite edges of the pit.

In drupes, such as clingstone peaches, for example, the pits are not of exactly the same size or contour or in the same position in the drupes. In torque-type pitters, the body of the drupe around each pit is normally bisected in the plane of the suture of the drupe. Where the pits are split in this plane, usually one-half of the pit remains in the pit cavity of the body of each drupe half. Each pit half so remaining is tightly adhered in the cavity.

In other types of clingstone pitters, the pit halves are cut from the halves of the drupe bodies.

The present invention is restricted to the removal of whole and half pits from bisected drupes irrespective of the symmetry or lack of symmetry of the pits or the positions of the pits in the drupe bodies.

SUMMARY

As a method, broadly, each pit is gripped at a pair of relatively widely spaced points along two of each of the opposite sides of each pit, and by a twisting movement of the pit and the body of the drupe half adhered thereto the pit is separated from the drupe body. As a more restricted step, the pit is gripped at said points irrespective of abnormal irregularities in the positioning of the pit in a drupe half, and abnormal irregularities in the outline of the pit along the surfaces to be gripped.

As a pitting head at a pit gripping station, the elements of the pitting head and their arrangement relative to each other are such that the foregoing method is practiced in a pitting operation.

DESCRIPTION OF DRAWINGS

FIG. 1 is an elevational view of a pitter with the pit gripping jaws in engagement with a pit in a drupe half, the body of the drupe half being shown in cross section as well as the plate against which its cut face of said body is supported.

FIG. 2 is a front elevational, fragmentary view of the pitting head only, with the drupe engaging plate only shown in cross section.

FIG. 3 is a fragmentary bottom plan view of the lower ends of the pit gripping jaw in holding engagement with a pit, and with the body of the drupe half omitted.

FIG. 4 is a view similar to that of FIG. 3 but showing a different position of the pit gripping jaws due to a variation in the contour of the pit.

FIG. 5 is a cross-sectional view taken along line 5—5 of FIG. 1, but without pit or drupe.

FIG. 6 is a fragmentary view of one pair of opposed jaws in a position for gripping a pit, with pit and drupe in cross section.

FIG. 7 is a side-elevational view of a modification of the pitter of FIG. 1 but showing the pit gripping jaws preparatory to movement to pit gripping relation.

FIG. 8 is a fragmentary side-elevational view of a portion of FIG. 7 as seen at right angle to FIG. 7.

FIG. 9 is a bottom plan view of the pit gripping jaws of the pitter of FIG. 7 in a position gripping a pit.

FIG. 10 is a fragmentary elevational view of one of the pit gripping jaws as seen from line 10—10 of FIG. 7.

In detail, referring to FIG. 1, a frame generally designated 1 supports a horizontally disposed plate 2 having an opening 3 therein, through which the whole or half pit 4 of the half 5 of a bisected drupe is exposed.

Hereinafter the word "pit" will refer to either a half or a whole pit, inasmuch as the pitter is equally adapted to remove one or the other.

A bracket 6, rigid with frame 1, includes a bearing 7 through which a vertical shaft 8 is vertically reciprocable, the upper end of which shaft carries an upwardly opening hollow drupe holder 9 in the form of an inverted cone, the sides of which may be of ribbed rubber or the like extending radially from the apex, for engaging the hemispherical outer surface of the drupe half 5, with the cut face 12 of the drupe half facing upwardly. In itself this is not new.

A coil spring 10 reacts between the holder 9 and the bearing 7 for yieldably urging the holder upwardly so that the cut face 12 of the drupe half is against the undersurface of plate 2 around opening 3 FIG. 6 with the pit 4 centered relative to opening 3 and exposed through said opening.

The lower end of shaft 8 projects below bearing 7 and carries a collar 13 thereon having oppositely outwardly directed pins 14 that respectively project into horizontal slots 15 in the yoke arms 16 of one end of a handle 17. The ends of the yoke arms 16 are pivotally supported on frame 1 at 18 for vertical oscillatory swinging of the handle 17 for moving the holder 9 downwardly against the tension of spring 10. When the holder is so moved, the drupe half in holder 9 may be removed and replaced by a substitute drupe, whereupon release of the handle will result in the holder moving upwardly to firmly position the cut face 12 of the unpitted drupe half against the under surface of plate 2 and for holding the drupe half against rotary movement relative to said holder upon twisting the pit.

The foregoing structure as shown in the drawings is illustrative of one means for presenting an unpitted drupe half to a pitter for removing the pit, and in itself is not new.

Coaxial with the shaft 10 and spaced above plate 2 is a vertical post 19, and a sleeve 20 is vertically reciprocable on said post 19. A spline 22 on said shaft extends into a groove 23 in the side of the sleeve connecting the post and sleeve for rotation as a unit about the axis of the post, while permitting reciprocable movement on the sleeve on the post.

The upper end of sleeve 20 is provided with a radially outwardly opening annular recess 24, and rollers 25 carried by the yoke arms 26 on one end of a handle 27 are positioned in said recess 24 at opposite sides of said sleeve. One of the ends of yoke arms are horizontally pivoted at 28 to brackets 29 rigid on frame 1. By this arrangement, vertical oscillatory movement of handle 27 will effect vertical reciprocatory movement of sleeve 20.

Post 19 has a vertically upward projecting extension 19′ of lesser diameter than the body of the post within sleeve 20, and spaced above bracket 29 is an uppermost laterally projecting bracket 30 having fork arms 33 at its outer end provided with coaxial openings through which the upper end extension 19′ rotatably extends, and in which the upper end of extension 19′ is rotatable. A collar or bearing 34 is secured on extension 19′ between arms 33, which collar permits rotation of post 19 while preventing vertical reciprocatory movement thereof.

Between brackets 29, 30 is an intermediate arm 38 projecting laterally from and rigid with frame 1, which arm is formed with an opening in its outer end through which extension 19′ extends, and opposite outwardly extending projections 40 on said outer end of the arm 38 extend over the upper end of sleeve 20 to function as a stop for limiting upward movement of the sleeve 20.

Above arm 38 and below the upper bracket 30 is a gear 42 secured on the extension 19′ of post 19. The teeth of a pinion 43 are in mesh with the teeth of gear 42.

Pinion 42 is secured on the lower end of a vertical shaft 44 that, in turn, is rotatably supported in a bearing on bracket 30. One end of an arm 45 is secured to the upper end of shaft 44 above bracket 30 and a handle 46 is secured on the opposite end of said arm 45. Upon revolving the handle to rotate pinion 42, the post 19 and sleeve 20 will be rotated as a unit.

A coil spring 47 connects an extension of bracket 30 with the handle 27 for yieldably holding sleeve 20 at the upper end of its movement on post 19 and against stop 40.

The lower end portion 48 (FIG. 5) of post 19 has parallel flat sides and at each of the opposite sides of portion 48 is a pair of horizontally spaced bell cranks 49 (FIGS. 1, 2) pivotally supported on said portion 48 by parallel horizontal pivots 50. Said pivots 50 are at the junctures between arms 53, 54 of each crank. The arms 53 of the pair of cranks at each side of portion 48 extend substantially horizontally outwardly relative to each other (FIG. 1) while arms 54 extend substantially vertically downward.

The cranks 49 at the opposite sides of portion 48 are identical, and are in directly opposed relation to each other at opposite sides of the portion 48, hence pivots 50 extend through the portion 48 (FIG. 5) and support the cranks at opposite sides of the latter.

The lower ends of the pair of arms 54 at each side of portion 48 of post 19 have bearings 55 (FIG. 5) rigid therewith, which bearings project horizontally outwardly relative to the vertical axis of said post (FIG. 2), and each bearing rotatably supports the enlarged portion 56 (FIG. 5) of a shaft 57 therein. The outer end 58 of each shaft 57 is of reduced diameter, and one end of an arm 59 is pivotally connected to the end portion 58 of each shaft 57. Arms 59 extend laterally outwardly away from each other at opposite sides of the pairs of reduced end portions 58 of shafts 57 (FIG. 1).

The inner or adjacent ends of the pairs of the enlarged portions 56 of shafts 57 are in axial alignment (FIG. 5) and said portions 56 have similarly positioned axially aligned extensions 60 that are rigid therewith, and which extensions 60 are eccentrically positioned relative to the axes of shafts 57. Said extensions are positioned below the level of the axes of shafts 57 and slightly outwardly relative to vertical planes bisecting shafts 57 longitudinally thereof for a reason later to be explained.

The lower ends of vertically extending tine carrying members 63 are each formed with an opening to pivotally receive and fit one of said extensions 60 (FIG. 5) and said members 63 extend upwardly (FIG. 2) along the opposed faces of the crank arms 54 that are at opposite sides of the vertical axis of post 19.

Each arm 54 is formed with a slot 64 (FIGS. 1, 5) extending longitudinally thereof, and a pin 65 secured to the upper end of each member 63 extends through the slot 64 in the arm 54 adjacent thereto, which pin is reciprocable in each slot longitudinally of the latter.

The outer end of each arm 59 is pivotally connected at 66 (FIG. 1) with the lower end of a vertically extending rod 67 and each rod 67 extends upwardly, and slidably, through the ends of projections 68 (FIGS. 1, 2) that are rigid with sleeve 20 at opposite sides of the latter. Nuts 69 on the upper ends of rods 67 above projections 68 limit downward movement of said rods, and a coil spring 70 around each rod 67 below each projection 68 reacts between the latter and a collar 71 adjustable for securement to different positions along each rod 67 to hold spring 70 under tension for yieldably holding each nut against each projection 68.

The outer ends of each opposedly positioned pair of crank arms 53 are formed with aligned openings 74 (FIG. 1) into which openings axially aligned pins 75 on an intermediate block 76 (FIG. 2) relatively loosely project.

A vertically extending rod 77 reciprocably extends through a central passageway in each block 76. A coil spring 78 is around the lower end of each rod 77 and reacts between nut 79 and block 76 while a heavier coil spring 80, around each rod 77, reacts between the upper side of each block 76 and an adjustable collar 81 is adjustably secured on rod 77 above the block 76. The uppermost end of each rod 77 is pivotally connected at 83 between ears 84 rigid on sleeve 20. By this structure both springs 70, 80 are under tension.

The lower ends of the tine carrying members 63 of each opposed pair are formed with convergently downwardly inclined outer surfaces 85 (FIG. 6) against each of which is secured the upper end of a tine 86, and a shoulder 87 on each member 63 may function as a stop or positioning surface for the upper end of each tine, each of the latter being rigidly but removably secured to each member 63 by screws 88.

The inner surfaces 89 of the lower ends of the members 63 of each opposed pair thereof are inclined downwardly and outwardly so that the surfaces 89 of the tines 86 will coact to form opposedly opening V surfaces adapted to engage the opposite edges of either a whole or a half pit 4 when the lower ends of said members are moved toward each other.

The tines 86 are each relatively narrow and pointed (FIGS. 2–4) and when the elements 63 are spread apart preparatory to entering the body 5 of the drupe half, their lower pointed ends are sufficiently widely spaced apart to not engage the pit 4. The space between the correspondingly positioned tines 86 at each of the opposite sides of the axis of post 19 is such that a portion 90 (FIG. 4) of the pit 4 will slightly project between the tines of said pairs.

In operation the members 63 (FIG. 6) will normally be in expanded position when the sleeve 20 is at the upper end of its movement. The holder 5 is lowered, against the resistance of spring 10 by downward movement of arm 17, and a drupe half 5 is positioned in said holder with its cut face directed upwardly.

Upon releasing the arm 17, the drupe half will be moved upwardly against the lower surface of plate 2 and the tines 86 will enter the body 5 of the drupe to positions at opposite sides of the pit 4 (FIG. 6).

Spring 47 has held sleeve 20 at the upper end of its movement to maintain the tines spaced to avoid the pit, but upon downward movement of arm 27 the sleeve 20 will be moved downwardly and rods 67 will effect rotation of cranks 49 about pivots 50 of a single pair thereof to swing both sets of tines 86 toward each other in parallel planes so that the two opposite edges of the pit will engage the inner sides of the apexes of the laterally opposed V-shaped contours provided by surfaces 89 and the tines, at which time said two opposite edges of the pit will be tightly gripped at four points by application of forces applied to said each of said two opposite edges in said planes in a direction transversely across the pit.

If, as seen in FIG. 3, the pit 4 is not symmetrically positioned relative to the tines, or if the set is of irregular contour, as in FIG. 4, the four tines 89 will still engage the pit, by reason of the eccentrically positioned extensions 60, and the individual springs 70, as well as the looseness of blocks 76 on rod 77 and the looseness of pivots 75 in the openings in crank arms 53. This structure permits the pair of cranks connected with each block 76 to move relative to each other and relative to block 76 so that the tines will accommodate themselves to abnormal variations in the pit at different tine engaging points.

After the pit is gripped, the pinion 43 is rotated by actuation of the handle 46 and the pit will be rotated relative to the drupe half to shear the pit from the drupe half.

Upon downward movement of the holder 9, and a return of the sleeve 20 to its upper position, the pit and drupe half will be released and may be returned for another unpitted drupe half to be positioned for pitting.

The modification shown in FIGS. 7, 8 is identical to the form shown in FIGS. 1–6 with the exception of the structure in FIGS. 1–5 providing for relative movement between separate tines of several pairs thereof. The description of the pitter of FIGS. 1, 2 up to the description of the bearings 55 on the lower ends of arms 34 in FIGS. 1, 2, describes exactly the structure shown in FIGS. 7, 8, therefore the same numbers will be employed in FIGS. 7, 8 for the parts that are the same as in FIGS. 1–6.

In FIGS. 7, 8, bell cranks 100 at opposite sides of portion 48 of the post 19 are pivotally carried by said portion on pivots 101, which pivots in turn are identical with pivots 50 of FIGS. 1, 2, said pivots being at the junctures between the arms 102 of the cranks that extend substantially horizontally outwardly relative to post 19, the same as arms 53 of cranks 49 and the other arms 103 of the cranks extend downwardly the same as arms 54 of cranks 49, but there are no bearings on the lower ends of arms 103.

Disposed between the outer ends of the arms 102 of the pair of cranks 101 at each side of the post 10, is a block 104 (FIG. 8) having pivots 105 (FIG. 7) at its opposite ends extending into openings in said outer ends of arms 102 for pivotally connecting said outer ends of arms 102 to block 104.

A vertical rod 106 slidably extends through an opening or passageway in block 104, and projects upwardly therefrom. A nut 107 on the lower end of each rod 106 engages the underside of block 104 to prevent withdrawing said rod from the block, and the upper end of each rod extends between and is pivotally connected to ears 108 that are rigid on sleeve 20 by a pivot 109. A coil spring 110 around said rod 106 reacts between the block 104 and a collar 111 adjustably secured on the upper end of said rod for yieldably holding the nut 107 against said block 104.

The similarity between rods 77, block 76, and ears 84 on sleeve 20 of FIGS. 1, 2 is apparent, but in the modification the lower spring 78 is omitted and the nut 107 directly engages the lower side of block 104.

Secured between the flat opposed sides of each pair of arms 103 at opposite sides of the axis of post 19 is a tine carrying member 113, that is similar to, but is slightly wider than each tine carrying member 63 of FIG. 2.

The lower end of each member 113 is inclined to provide a surface corresponding to the surface 85 in FIG. 6, but without the shoulder 87, and a two-tined element 114 (FIGS. 7–10) is secured against said surface so the tines 115 of each pair occupy substantially the same position as the pairs of tines 86 at each side of the axis of post 19.

The tines 115, like tines 86 are relatively thin and pointed; hence their entry into the flesh of the drupe half and their movement to pit gripping relation is without objectionable injury to the fruit or noticeable after cooking.

The generally opposed surface 116 of the pair of tine carrying members are inclined relative to the tines to provide the V shaped recesses for engaging the pits at the apices of said recesses and these surfaces 116 are centrally recessed as at 117 (FIG. 10) to accommodate the convex contours of pits adjacent to their edges that define their sutures.

FIG. 9 shows the edges 118 of pit 4 engaged by the tines 115 and said edges projects, as at 119, between the tines of each pair in most instances.

The operation of the form of the invention shown in FIGS. 7–9 is the same as in FIGS. 1–8, except that the tines 115 of the two pairs are not movable independently of each other.

While I have illustrated and described the invention in detail, I do not wish to limit myself to the precise details so shown and described, but desire to avail myself of such variations and modifications as may come within the scope of the appended claims.

I claim:

1. A method of removing the pit from the generally hemispherical half of a drupe having a planar cut face and a pit cavity within said face in which a pit is adhered with said face disposed in a plane perpendicular to an axis extending substantially centrally through said pit and cavity, comprising the steps of:
    (a) supporting said half stationary with its cut face against a planar surface and with its pit exposed for gripping engagement at a pair of spaced points along each of two opposite edges of said pit with a portion of said pit projecting radially outwardly between said pairs of points and between the points of each pair,
    (b) tightly gripping said two opposite edges of said pit at said pairs of spaced points by forces applied to said opposite edges at said pairs of spaced points directed transversely across said pit between said two opposite edges in parallel planes and then
    (c) rotating said gripping forces while said pit is so gripped for rotating said pit substantially about said axis relative to said drupe half for freeing said pit from adherence between said pit and said pit cavity,
    (d) the distance between said gripping points in one of said planes relative to the distance between the gripping points in the other plane being variable according to variations in the distances between said opposite edges of said pits at said points.

2. Apparatus for pitting the generally hemispherical half of a drupe having a planar cut face and a pit cavity in said face in which a pit is adhered with said face disposed in a plane perpendicular to an axis extending substantially centrally through said pit and cavity, comprising:
    (a) a stationary plate adapted to be engaged at one side thereof by said cut face formed with an opening for exposing said pit therethrough,
    (b) one pair only of pit-gripping jaws in spaced opposed relation, said pit gripping jaws including pit engaging elements carried thereby and projecting therefrom,
    (c) means for positioning said pit gripping jaws in a position at the side of said plate opposite to said one side with said elements projecting through said opening adjacent to two opposite edges of a pit adhered in a pit cavity when said cut face is against said one side with the pit exposed through said opening,
    (d) means connected with said jaws for moving them toward each other for moving said elements into engagement with said two opposite edges of said pit when said jaws are in said position to grip said pit, a single pivot support each of said jaws for said movement thereof toward each other and for carrying said elements on said jaws in parallel planes into engagement with said opposite edges of said pit, (e) means for holding a drupe half stationary with its cut face against said one face around said opening, and (f) means connected with said jaws for revolving them and the elements thereon about said axis when said elements are in pit gripping relation, (g) said elements being in two pairs respectively disposed at each of said two opposite edges of such pit with the elements of each pair spaced apart a substantial distance to engage said pit at spaced points along said edges, (h) the said elements of each pair being spaced apart a sufficient distance for projection of a portion of the pit edges of said pit between the projections of each pair to insure against slippage of said elements relative to said pit when the former are in engagement with the edges of said pit, and each of said elements being relatively narrow and pointed at their ends remote from said jaws.

3. Apparatus for pitting the generally hemispherical half of a drupe having a planar cut face and a pit cavity in said face in which a pit is adhered with said face disposed in a plane perpendicular to an axis extending substantialy centrally through said pit and cavity, comprising:

(a) a stationary plate adapted to be engaged at one side thereof by said cut face formed with an opening for exposing said pit therethrough, (b) pit-gripping jaws in spaced opposed relation, said pit gripping jaws including pit engaging elements projecting therefrom, (c) means for positioning said pit gripping jaws in a position at the side of said plate opposite to said one side with said elements projecting through said opening adjacent to two opposite edges only of a pit adhered in a pit cavity when said cut face is against said one side with the pit exposed through said opening, (d) means connected with said jaws for moving them toward each other for moving said elements into engagement with said two opposite edges of said pit when said jaws are in said position to grip said pit, (e) means for holding a drupe half stationary with its cut face against said one face around said opening, and (f) means connected with said jaws for revolving them and the elements thereon about said axis when said elements are in pit gripping relation, (g) said elements being in pairs respectively disposed at each of said two opposite edges of such pit with the elements of each pair spaced apart a substantial distance to engage said pit at spaced points along said edges, (h) means connected with each of said elements for urging each element into engagement with the edges of said pit independently of the others, under application of a predetermined force applied to said elements for moving them toward said pit, whereby each of said elements will engage said pit irrespective of variations in the outlines of different pits.

4. In apparatus as defined in claim 3:

(i) said plate being horizontal with said one side lowermost, and (j) said means for positioning said pit gripping jaws with said elements projecting through said opening including a support stationarily positioned over said opening, (k) said means connected with said jaws for so moving them including a member vertically reciprocable on said support, (l) means pivotally supporting each of said elements on said support for movement relative to the others, (m) a spring for each of said elements positioned between each element and said member for yieldably urging each of said elements into yieldable engagement with a pit under different tensions according to the variations in the incline of said pit upon movement of said member on said support toward a pit in a position to be gripped by said elements.

References Cited

UNITED STATES PATENTS

| | | | |
|---|---|---|---|
| 2,382,961 | 8/1945 | Coons | 146—238 |
| 2,880,774 | 4/1959 | Perrelli | 146—28 |
| 2,975,812 | 3/1961 | Perrelli | 146—28 |

ANDREW R. JUHASZ, Primary Examiner

F. R. BILINSKY, Assistant Examiner

U.S. Cl. X.R.

146—28